United States Patent [19]

Reeber et al.

[11] Patent Number: 4,635,108
[45] Date of Patent: Jan. 6, 1987

[54] SCANNER-PREVIEWER COMBINATION INCLUDING A PROGRAMMABLE SAMPLING CIRCUIT FOR PERMITTING AN ENTIRE FRAME OF AN ORIGINAL TO BE STORED IN A FIXED-CAPACITY MEMORY

[75] Inventors: Nicholas J. Reeber, Hauppauge; Sheldon J. Kerbel, Merrick, both of N.Y.

[73] Assignee: 501 Hazeltine Corporation, Commack, N.Y.

[21] Appl. No.: 531,144

[22] Filed: Sep. 9, 1983

[51] Int. Cl.$^4$ .......................... G03F 3/10; H04N 1/04; H04N 1/06; H04N 1/46
[52] U.S. Cl. ...................................... 358/76; 358/77; 358/78; 358/285; 358/287; 358/289
[58] Field of Search ....................... 358/75, 76, 77, 78, 358/80, 287, 280, 283, 285, 288

[56] References Cited

U.S. PATENT DOCUMENTS

| | | | |
|---|---|---|---|
| 4,037,249 | 7/1977 | Pugsley | 358/76 |
| 4,285,009 | 8/1981 | Klopsch | 358/76 |
| 4,393,398 | 7/1983 | Horiguchi et al. | 358/80 |

FOREIGN PATENT DOCUMENTS 2037532 7/1980 United Kingdom ................ 358/287

Primary Examiner—James J. Groody
Assistant Examiner—Randall S. Svihla
Attorney, Agent, or Firm—Blum Kaplan Friedman Silberman & Beran

[57] ABSTRACT

Signals corresponding to the color content of an original, generated by scanning the original mounted on a rotating drum, are sampled and held at a coarse or low-resolution scanning rate. The number of samples per line (revolution) and the number of revolutions along which scanning is performed correspond to a raster scan of a video display. The signals are converted into digital signals and stored in a memory. The rate of sampling is adjusted so that samples from an entire frame of the original fill the memory. The stored signals are converted to analog signals, adjusted by a color computer to simulate a printing process and displayed at a raster scan rate on a video display. The apparatus according to the invention may be a scanner-previewer combination to achieve a previewing of the original, or may be a scanner with additional apparatus.

12 Claims, 3 Drawing Figures

SCANNER-PREVIEWER COMBINATION INCLUDING A PROGRAMMABLE SAMPLING CIRCUIT FOR PERMITTING AN ENTIRE FRAME OF AN ORIGINAL TO BE STORED IN A FIXED-CAPACITY MEMORY

BACKGROUND OF THE INVENTION

1. Field of the Invention

The invention generally relates to a combination of an electronic scanner for producing color separations and a scanner-previewer so that a scanned original can be previewed before the separations are exposed. In particular, the invention relates to an electronic scanner for color separations including apparatus for previewing.

2. Description of the Prior Art

Electronic scanners for scanning color originals (such as transparencies or reflection copies) and for exposing separations corresponding to the original are well known in the prior art. In addition, separation previewers as disclosed in U.S. Pat. Nos. 3,800,071 and 3,800,075 are also known. In general, an original is scanned by a scanner and four color separations are produced on film. Before the printing process, the film separations are previewed by a previewer. If the separations, as previewed, are unacceptable, the scanner controls are adjusted and the separations are rescanned from the original. U.S. Pat. No. 4,300,158 describes an apparatus for coordinating the adjustment of a previewer and a scanner.

The presently known systems and apparatus failed to provide an opportunity to preview the scanner's results before exposure of the separations.

SUMMARY OF THE INVENTION

It is an object of this invention to provide an apparatus which previews the results of a scanning procedure before separations are exposed from the original.

It is another object of this invention to provide a scanner-previewer combination which previews the result before separations are exposed.

The apparatus according to the invention is for use in combination with a scanner including a first means for scanning an original and providing signals corresponding to its color content. Computer means of the scanner are responsive to operator controls and provide adjusted signals derived from the signals provided by the first means. An exposing unit exposes film separations corresponding to the adjusted signals. In particular, the invention includes means for sampling the adjusted signals provided by the computer means of the scanner. The number of samples corresponds to a raster scan rate. The sampled signals are converted into digital preview signals which are stored in a supplemental memory and subsequently provided to a digital-to-analog converter which converts the signals into analog TV signals. A color computer adjusts the analog TV signals to simulate a printing process and the adjusted signals are displayed at the raster scan rate on a CRT.

Alternatively, the invention may be a scanner in combination with a separation previewer which includes a means for scanning film separations (such as a camera) and providing analog signals corresponding to the color content of the separations. The analog signals are converted into digital signals and stored in a memory. A digital-to-analog converter converts the stored digital signals into analog TV signals. A color computer adjusts the analog TV signals to simulate a printing process and the adjusted TV signals are displayed at a raster scan rate on a CRT. The scanner-previewer combination of the invention further includes means for sampling the adjusted signals provided by the computer means of the scanner. The number of samples corresponds to a raster scan rate. The sampled signals are converted into digital preview signals which are stored in a supplemental memory and provided to the digital-to-analog converter of the separation previewer.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
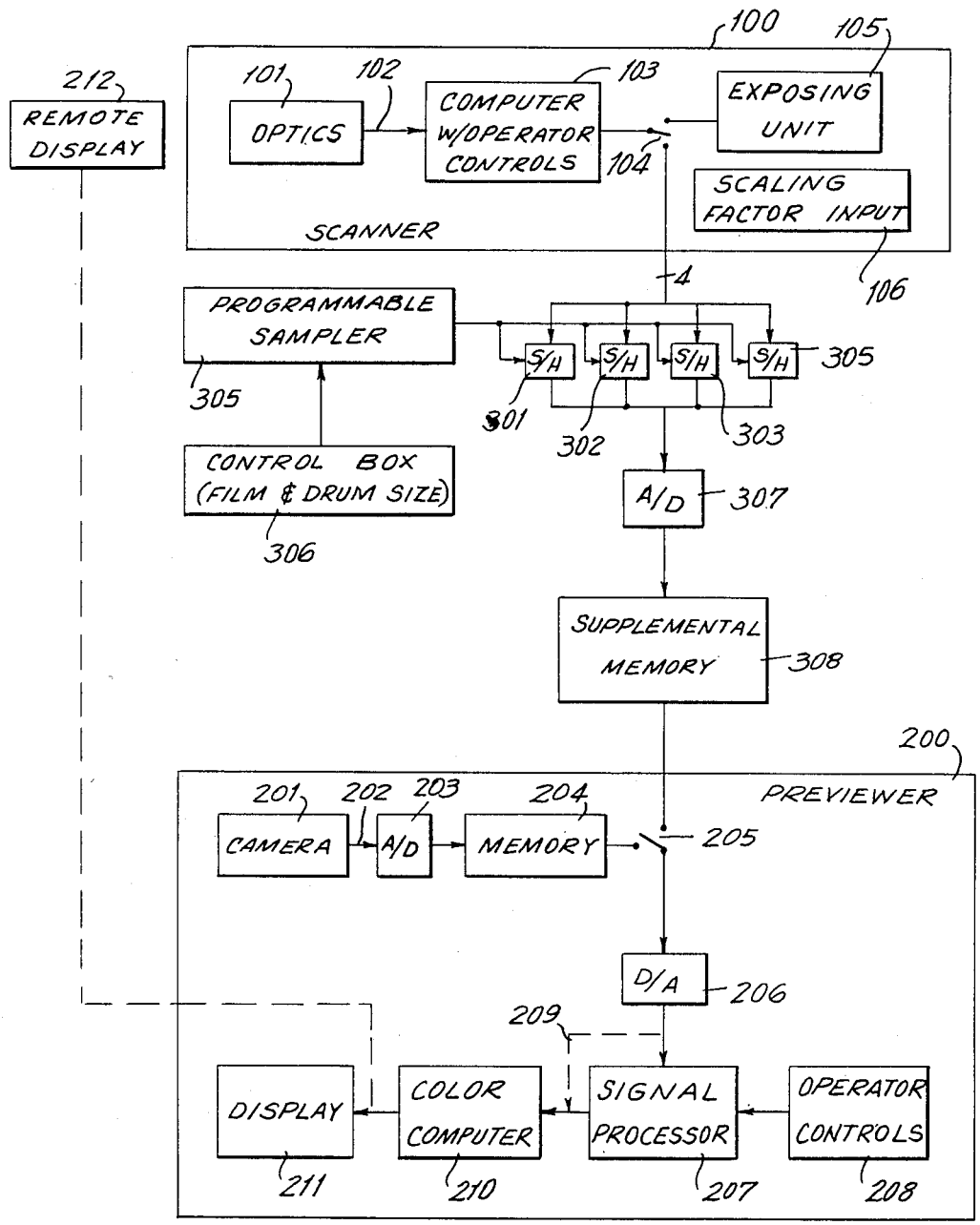
FIG. 1 is a functional block diagram of a scanner-previewer combination according to the invention.

As shown in FIG. 1, reference character 100 refers to a scanner known in the prior art. Such scanners include optics 101 for scanning a color original. Preferably, such optics are in the form of a rotating illuminated drum on which the original is mounted and a detector responsive to light passing through a transparency or being reflected from a reflection copy as the drum is rotated. The detector traverses the width of the original along the drum as the drum is rotated. Scaling factor input 106 includes a keyboard which controls the speed at which the detector travels. Signals corresponding to this detected light are provided via line 102 to a computer 103. These signals may be in analog from and are adjusted by computer 103 so that the adjusted signals may be used to expose separations corresponding to the original. Computer 103 is provided with operator controls which permit an operator to manually adjust the signals before separations are generated from the signals. The adjusted signals are provided via switch 104 in the up position to exposing unit 105 which exposes separations corresponding to the original.

Reference character 200 generally refers to a previewer such as described and disclosed in U.S. Pat. Nos. 3,800,071 and 3,800,075, assigned to Hazeltine Corporation. Such previewers generally include a camera 201 which views illuminated film separations and provides signals via line 202 to an analog-to-digital (A/D) converter 203 which converts the signals to corresponding digital signals. The corresponding digital signals are stored in memory 204 and provided via switch 205 in the down position to digital-to-analog (D/A) converter 206 at a raster scan rate. The converted analog signals may then be adjusted by signal processor 207 which is responsive to operator controls 208 or may be directly supplied via line 209 to color computer 210 which simulates a printing process. The adjusted signals are then displayed at a raster scan rate on CRT 211.

The invention addresses the need for previewing signals which have been adjusted by computer 103 before such signals are provided to exposing unit 105 for the generation of separations. Switch 104 in the down position provides the adjusted signals to sample and hold (S/H) circuits 301, 302, 303 and 304. Four signals corresponding to the four color separations are provided to these sample and hold circuits. Programmable sampler 305 is programmed with information which controls the sample and hold circuits. In particular, programmable sampler 305 samples the continuous analog signals provided by computer 103. The number of samples corresponds to the raster scan rate at which signals are displayed by CRT 211. For a given system, this number is fixed. Programmable sampler 305 receives input information from control box 306 which indicates the size of the original being scanned and the diameter of the drum on which the original is mounted. This information is used to determine the sampling period. The sampled and held signals are then provided to A/D 307 and stored in supplemental memory 308. The stored signals are read out of supplemental memory 308 at the raster scan rate and provided through switch 205 in the up position to D/A 206. These signals are then provided to color computer 210 via line 209 or via signal processor 207 and displayed by CRT 211.

As a result, the signals corresponding to a scanned original are previewed before the exposure of separations therefrom. This permits the operator to adjust the controls of computer 103 and rescan the original before the actual exposure of the separations by exposing unit 105. Preferably, a fast, coarse scan rate is employed to preview the original before the actual fine high resolution scan used to expose the separations. In the preferred embodiment, the raster scan rate of display 211 is the standard TV scan rate and programmable sampler 305 is programmed to actuate S/H circuits 301–304 to generate 512 bits of information for each scanned line of the original regardless of its size. Programmable sampler 305 determines when to turn S/H circuits on based on the input provided by control box 306 which indicates the size of the original and the diameter of the drum. As a result of this information, programmable sampler 305 turns S/H circuits 301–304 on and off so that, during the scanning of an original, 512 bits of information are generated over each scanned line of the original. The number of samples is related to the resolution of previewer 200. The number of bits of information per scanned line (i.e. 512 for TV rates) which are generated is independent of the size of the original. As a result, a smaller original has more samples per unit length and, therefore, is scanned at a higher resolution than a larger one.

The number of lines of information generated as the detector traverses along the width of the original mounted on the drum of optics 101 is determined by the speed of traverse of the detector. The operator adjusts the keyboard of scaling factor input 106 so that the number of lines generated corresponds to the number of raster scan lines of display 211. In the preferred embodiment, the number of raster scan lines of display 211 is approximately equal to the standard TV scan line number and is compatible with the storage capacity of supplemental memory 308 i.e. 512 lines. Therefore, the speed of traverse of the detector is set by the operator so that 512 revolutions of the drum occur from the beginning to the end of traverse of the detector along the original. The number of lines is independent of the size of the original. As a result, a smaller original is traversed by the detector at a slower speed and, therefore, is scanned at a higher resolution than a larger one.

Previewer 200 may be provided with a remote display 212 which may be located at the site of scanner 100.

Figure 2:
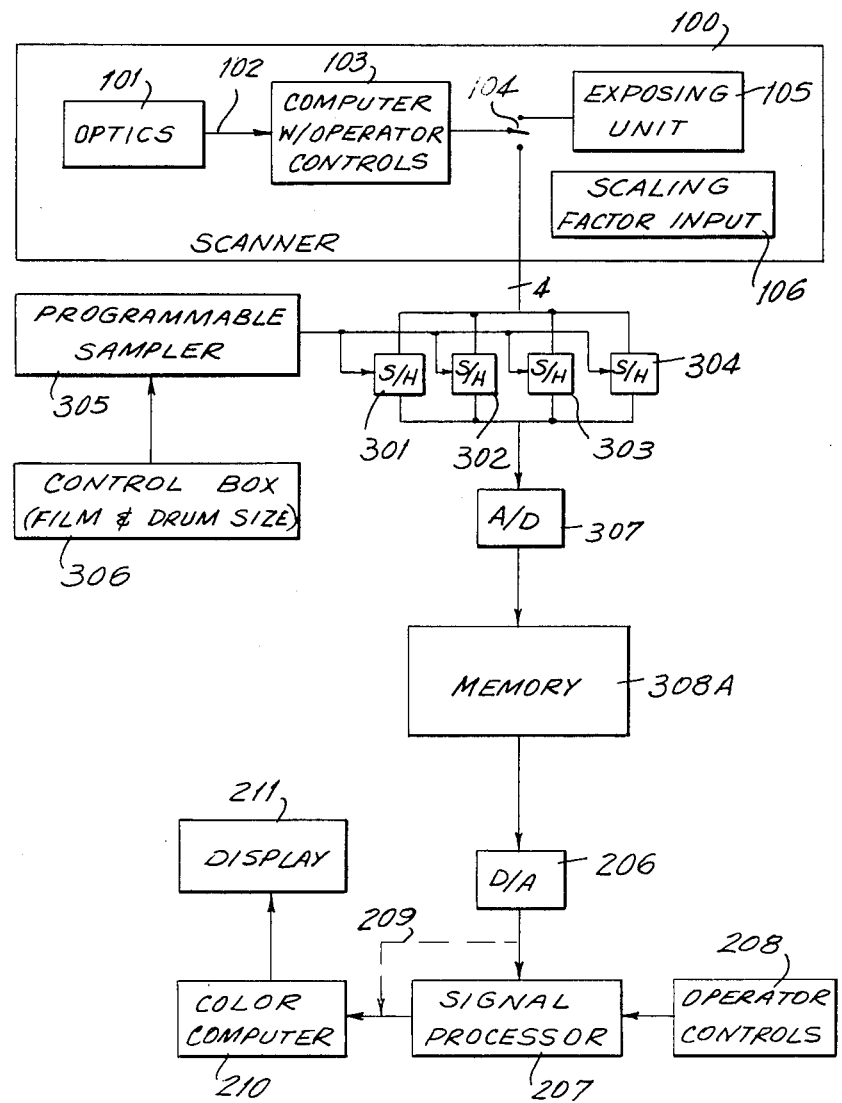
FIG. 2 is a functional block diagram of a scanner in combination with an apparatus for previewing a scanned original before exposure of the separations.

FIG. 2 illustrates scanner 100 in combination with apparatus for previewing signals corresponding to a scanned original. The reference characters of FIG. 2 which are the same as those of FIG. 1 indicate the same structure. The apparatus of FIG. 2 does not also perform the previewing of film separations so that camera 201, A/D 203 and memory 204 are not necessary. As a result, D/A 206 is directly connected to memory 308A and switch 205 is unnecessary. Memory 308a is no longer a supplemental memory but the only memory since memory 204 is unnecessary. The apparatus of FIG. 2 is known as an integral previewing system.

Preferably, the inventions as illustrated in FIG. 1 and 2 would be used in the following manner. An original to be previewed would be mounted on the drum of optics 101 and scanned. The scanning rate would be a coarse or low resolution scan rate so that the entire scanning operation would take approximately 25 seconds. The signals resulting from such scaning would then be viewed on display 211 or remote display 212. If the display is acceptable the original would be scanned at a high resolution scan rate and switch 104 would be in the up position so that exposing unit 105 would be provided with the signals and film separations would be generated. If the display is unacceptable, the operator controls of computer 103 would be adjusted to correct the problems viewed on the display. At this point, the operator would have the option of again scanning for the purpose of previewing or, if the operator is comfortable with the reset of the controls of computer 103, the operator may perform a high resolution scan of the original.

In the graphic arts printing process there is a need for high quality results. This need frequently results in an original being scanned by a scanner which produces film separations and the viewing of the film separations immediately thereafter to insure that they closely correspond to the original and will provide the desired printing results. In many such cases, the original must be maintained mounted on the drum of optics 101 and cannot be removed from the drum until the separations have been printed and viewed or proofed in another manner. The invention avoids the need for exposing separations and waiting for proofing to be completed before the results of scanning can be previewed.

Figure 3:
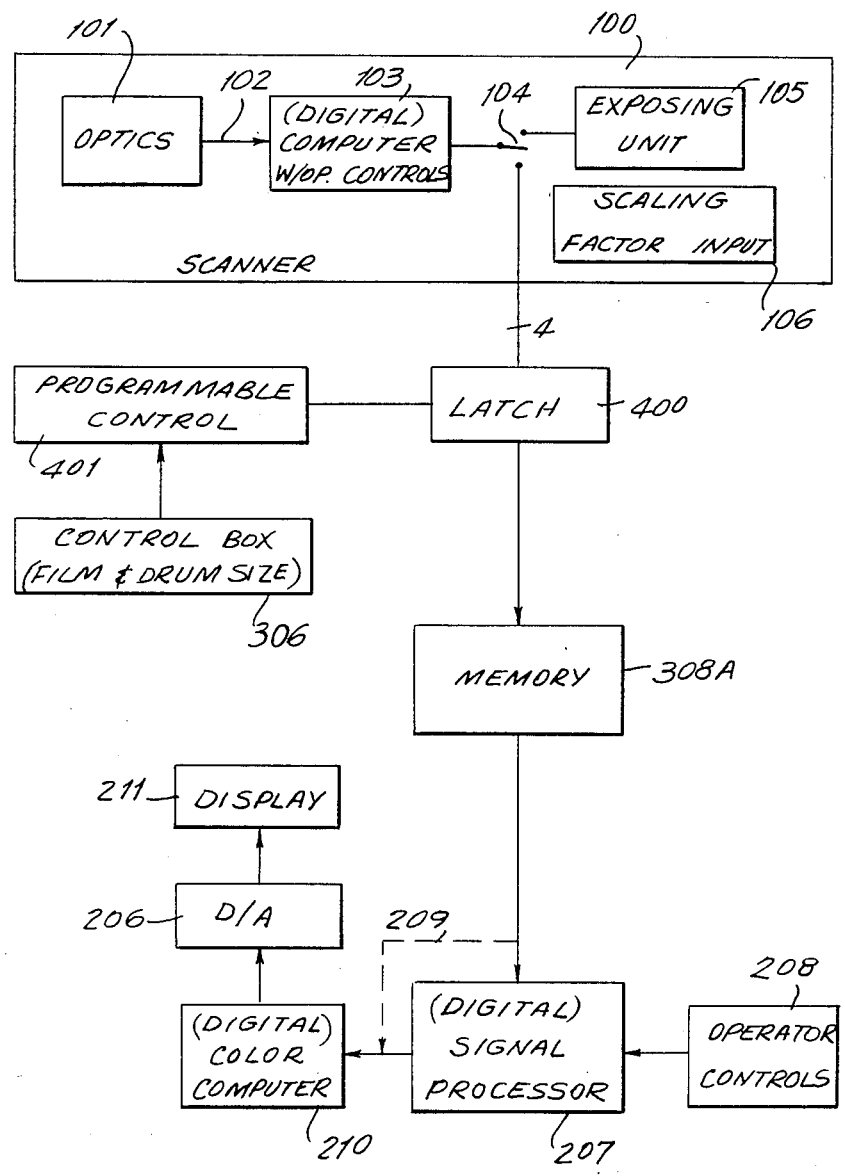
FIG. 3 is a functional block diagram of the apparatus of FIG. 2 including digital computers.

Signal processor 207 and color computer 210 have been described and illustrated as analog systems. However, as shown in FIG. 3, it is contemplated that signal processor 207 and color computer 210 may be digital systems in which case D/A 206, if necessary, would be located between color computer 210 and display 211. Use of such digital systems in place of the analog systems and relocation of the D/A 206, if necessary, is considered equivalent to the described and claimed structure.

Computer 103 of scanner 100 has been described and illustrated as an analog system. However, as shown in FIG. 3, it is contemplated that computer 103 may be digital in which case its output could be stored directly in memory 308A by latch 400 responsive to programmable control 401. Use of a digital computer in place of analog computer 103 is considered equivalent to the described and claimed structure.

While there have been described what are at present considered to be the preferred embodiments of the invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus comprising:
   (1) a scanner comprising:
      (a) scanning means for scanning an original and providing first signals corresponding to the color content of the original;
      (b) computer means responsive to operator controls for providing adjusted signals corresponding to the first signals; and
      (c) exposing unit means for providing color separations corresponding to the adjusted signals;
   (2) a previewer comprising:
      (a) means for producing second signals corresponding to the content of the color separations;
      (b) converting means for converting the second signals into digital signals to be stored;
      (c) a first memory for storing the digital signals;
      (d) second converting means for converting the stored digital signals into TV signals;
      (e) a color computer for adjusting the TV signals so as to produce adjusted TV signals to simulate a printing process; and
      (f) a display for displaying the adjusted TV signals;
   (3) said apparatus further comprising:
      (a) sampling means for sampling the adjusted signals provided by the computer means of the scanner to produce sampled adjusted signals;
      (b) a supplemental memory for storing the sampled adjusted signals;
      (c) programmable control means for controlling said sampling means to sample the adjusted signals so that the number of samples produced, per an entire frame of the original, corresponds to the capacity of said supplemental memory; and
      (d) means for providing said sampled adjusted signals stored in said supplemental memory to said second converting means.

2. The apparatus of claim 1 wherein said programmable control means comprises a control for providing information to the programmable control means indicating the size of the original and the diameter of a drum of the scanning means upon which said original is mounted.

3. The apparatus of claim 2 wherein said previewer further comprises a signal processor responsive to operator controls for adjusting the TV signals before the TV signals are provided to the color computer.

4. The apparatus of claim 3 further comprising a remote display for displaying the adjusted TV signals at the location of said scanner.

5. An apparatus comprising:
   (1) a scanner comprising:
      (a) scanning means for scanning an original and providing first signals corresponding to the color content of the original; and
      (b) computer means responsive to operator controls for providing adjusted signals corresponding to the first signals;
   (2) sampling means for sampling the adjusted signals provided by the computer means of the scanner;
   (3) first converting means for converting the sampled signals into digital preview signals;
   (4) a memory for storing the digital preview signals;
   (5) second converting means for converting the stored digital preview signals into analog TV signals;
   (6) a color computer for adjusting the analog TV signals to simulate a printing process;
   (7) a display for displaying the adjusted analog TV signals; and
   (8) programmable control means for controlling said sampling means to sample the adjusted signals so that the number of samples produced, per an entire frame of said original, corresponds to the storage capacity of said memory.

6. The apparatus of claim 5 further comprising a signal processor responsive to operator controls for adjusting the analog TV signals before the analog TV signals are provided to the color computer.

7. The apparatus of claim 5, wherein said sampling means comprises a plurality of sample and hold circuits for receiving the adjusted signals provided by the computer means of the scanner, said programmable control means controlling the sample and hold circuits; and a control for providing information to the programmable control means indicating the size of the original and the diameter of a drum of the scanning means upon which said original is mounted.

8. An apparatus comprising:
   a scanner comprising:
      (a) scanning means for scanning an original and providing first signals corresponding to the color content of the original; and
      (b) computer means responsive to operator controls for providing adjusted signals corresponding to the first signals;
   said apparatus further comprising:
      (1) sampling means for sampling the adjusted signals provided by the computer means of the scanner;
      (2) a memory for storing the adjusted signals sampled by said sampling means;
      (3) converting means for converting the stored signals into TV signals;
      (4) a color computer for adjusting the TV signals so as to produce adjusted TV signals to simulate a printing process;
      (5) a display for displaying the adjusted TV signals; and
      (6) programmable control means for controlling said sampling means to sample the adjusted signals so that the number of samples produced, per an entire frame of said original, corresponds to an amount no greater than the storage capability of said memory.

9. The apparatus of claim 8 further comprising a signal processor responsive to operator controls for adjusting the TV signals before the TV signals are provided to the color computer.

10. An apparatus comprising:
    a scanner comprising:
      (a) scanning means for scanning an original and providing first signals corresponding to the color content of the original; and
      (b) digital computer means responsive to operator controls for providing adjusted digital signals corresponding to the first signals;
    said apparatus further comprising:
      (1) sampling means for sampling the adjusted digital signals provided by the computer means of the scanner, said sampling means providing digital preview signals; and a programmable control for controlling the sampling means;

(2) a memory for storing the digital preview signals, said programmable control controlling said sampling means to sample the adjusted digital signals so that the number of samples produced, per an entire frame of said original, corresponds to the storage capacity of said memory;

(3) a color computer for adjusting the digital preview signals to simulate a printing process; and (4) means for displaying the adjusted digital preview signals.

11. The apparatus of claim 10 further comprising a signal processor responsive to operator controls for adjusting the digital preview signals before the digital preview signals are provided to the color computer.

12. The apparatus of claim 10 wherein said sampling means comprises a latch circuit for receiving the adjusted signals provided by the digital computer means of the scanner, said programmable control controlling the latch circuit; and a control means for providing information to the programmable control indicating the size of the original and the diameter of a drum of the scanning means upon which said original is mounted.

* * * * *